(12) United States Patent
Hartmann et al.

(10) Patent No.: US 11,038,244 B2
(45) Date of Patent: Jun. 15, 2021

(54) BATTERY MODULE FOR A MOTOR VEHICLE

(71) Applicant: StreetScooter GmbH, Aachen (DE)

(72) Inventors: Stephan Hartmann, Solothurn (CH);
Nils Armbruster, Zürich (CH);
Alejandro Lorca Mouliaà, Basel (CH)

(73) Assignee: StreetScooter GmbH, Aachen (DE)

( * ) Notice: Subject to any disclaimer, the term of this patent is extended or adjusted under 35 U.S.C. 154(b) by 324 days.

(21) Appl. No.: 16/364,325

(22) Filed: Mar. 26, 2019

(65) Prior Publication Data

US 2019/0296314 A1     Sep. 26, 2019

(30) Foreign Application Priority Data

Mar. 26, 2018   (DE) .................... 10 2018 107 091.8

(51) Int. Cl.
*H01M 2/20*     (2006.01)
*H01M 2/10*     (2006.01)
(Continued)

(52) U.S. Cl.
CPC ......... *H01M 50/502* (2021.01); *H01M 50/20* (2021.01); *H01M 50/572* (2021.01); *H01M 2220/20* (2013.01); *Y02E 60/10* (2013.01)

(58) Field of Classification Search
CPC ............ H01M 2220/20; H01M 50/20; H01M 50/502; H01M 50/572; Y02E 60/10
See application file for complete search history.

(56) References Cited

U.S. PATENT DOCUMENTS

2018/0006282 A1*   1/2018   Favaretto ............ H01M 10/425
2019/0131672 A1*   5/2019   Stafl .................... H01M 50/502

FOREIGN PATENT DOCUMENTS

WO     WO 2015/111758 A1     7/2015

OTHER PUBLICATIONS

Machine translation of German Office Action received in related DE102018107091.8 dated Oct. 29, 2018 (pp. 5).

\* cited by examiner

*Primary Examiner* — Lingwen R Zeng
(74) *Attorney, Agent, or Firm* — Woodard, Emhardt, Henry, Reeves & Wagner, LLP

(57) ABSTRACT

The subject matter of the invention is a battery module for a motor vehicle having a multiplicity of battery cells, each having a first pole and a second pole and a contact plate which extends in a transverse direction and in a longitudinal direction, wherein a first group of the battery cells are connected via their respective first pole, one after the other to a first side, extending in the longitudinal direction, of the contact plate, and a remaining second group of the battery cells are connected by their respective second pole, one after the other to a second side, extending in the longitudinal direction, of the contact plate, with the result that, by means of the contact plate the first group of the battery cells are connected via the first poles, and the second group of the battery cells are connected via the second poles, in parallel, and the first group of the battery cells and the second group of the battery cells are connected in series, and between adjacent first poles on the first side and/or between adjacent second poles on the second side, at least one cutout, extending in the transverse direction, is provided in the contact plate, with a length such that the ratio of the resistance of the contact plate in the extent in the longitudinal direction with respect to the resistance of the contact plate in the extent in the transverse direction is ≥2.

11 Claims, 3 Drawing Sheets

(51) Int. Cl.
*H01M 2/34* (2006.01)
*H01M 50/502* (2021.01)
*H01M 50/20* (2021.01)
*H01M 50/572* (2021.01)

BATTERY MODULE FOR A MOTOR VEHICLE

CROSS-REFERENCE TO RELATED APPLICATIONS

This application claims the benefit of German Patent Application No. 10 2018 107 091.8 filed Mar. 26, 2018, which is hereby incorporated by reference.

TECHNICAL FIELD

The invention relates to a battery module having a multiplicity of battery cells, each having a first pole and a second pole and a contact plate which extends in a transverse direction and in a longitudinal direction. In addition, the invention relates to a method for reducing currents in the longitudinal direction of a contact plate, extending in a transverse direction and in the longitudinal direction, of a battery module for a motor vehicle, with which battery module a multiplicity of battery cells, each having a first pole and a second pole, can be connected.

BACKGROUND OF THE INVENTION

According to the latest estimates, it is expected that in Germany alone there will be a million electric vehicles by 2020, wherein the majority of purely electrically driven vehicles will be for fleet applications and car sharing applications. With respect to the batteries which are necessary to operate the electrical driven vehicles, also referred to as an electric car or E car or E vehicle or electric vehicle, it has been recognized that the batteries should be assembled in an application-specific fashion from a multiplicity of standardized battery cells as a "tailored assembly", since this is more cost effective than using adapted battery cells.

Such a battery generally has a plurality of battery modules which are arranged one next to the other and/or one on top of the other in the battery. In the individual battery modules, a multiplicity of battery cells are held in cell holders with housing shells. By means of a corresponding configuration and arrangement it is possible to use contact plates to bring about suitable electrical connection of the battery cells in order to implement a necessary voltage or battery capacity for desired applications. As a result, first poles of one group of the battery cells are electrically connected in series to one side of the contact plate, and second poles of another group of battery cells are also electrically connected in series to a second side of the contact plate, in order, on the one hand, to connect the first group of battery cells and the second group of battery cells in each case in parallel in what are referred to as parallel phases and, on the other hand, to connect the first group of battery cells and the second group of battery cells in series.

In order to arrange them in a space-saving way, the usually cylindrical battery cells are arranged one next to the other in the manner of a triangle, with the result that two adjacent battery cells of the one group or second group are always arranged adjacent to a battery cell of the second group or first group, in what is referred to as a delta connection. However, the delta connection can result in currents in the longitudinal direction of the contact plate between the battery cells which are connected in parallel, which currents disadvantageously reduce the usable current and the service life of the battery module. In addition, the currents give rise to different voltage levels at the individual battery cells of the parallel phases, as a result of which reliable operation of a vehicle which is driven by means of the battery module is not ensured and a state of health, SOH, calculation as well as calculation of the range of the electric vehicle are made difficult.

DESCRIPTION OF THE INVENTION

Taking this situation as a starting point, an object of the present invention is to specify a battery module for a motor vehicle having a multiplicity of battery cells and a contact plate, in which battery module currents between battery cells of a parallel phase are reduced.

The object of the invention is achieved by means of the features of the independent claims. Advantageous refinements are specified in the dependent claims.

Accordingly, the object is achieved by means of a battery module for a motor vehicle with a multiplicity of battery cells, each having a first pole and a second pole and a contact plate which extends in a transverse direction and in a longitudinal direction, wherein a first group of the battery cells are connected by their respective first pole one next to the other to a first side, extending in the longitudinal direction, of the contact plate, and a remaining second group of the battery cells are connected by their respective second pole one next to the other to a second side, extending in the longitudinal direction, of the contact plate, with the result that, by means of the contact plate, the first group of the battery cells are connected in parallel via the first poles, and the second group of the battery cells are connected in parallel via the second poles, and the first group of the battery cells and the second group of the battery cells are connected in series, between adjacent first poles, between adjacent second poles and/or between a first pole and an adjacent second pole in the contact plate at least one cutout, extending in the transverse direction, is provided with a length that owing to the cutout the ratio of the resistance of the contact plate in the extent in the longitudinal direction with respect to the resistance of the contact plate in the extent in the transverse direction is ≥2.

An essential point in the invention is the configuration of the contact plate in such a way that owing to the at least one cutout in the longitudinal direction the resistance of the contact plate is ≥2 of the resistance of the contact plate in the extent in the transverse direction. Owing to the battery cells which are connected to the contact plate, increasing the resistance in the longitudinal direction of the contact plate causes current flowing through the contact plate to be channeled in the transverse direction, with the result that undesired currents in the longitudinal direction are virtually or completely eliminated. As described above, in the case of what is referred to as a delta connection of the battery cells to the contact plate undesired currents come about between the battery cells which are connected in series in the longitudinal direction to the contact plate and are in this way connected in parallel. By forming the cutout which extends in the transverse direction into the contact plate it is possible to implement the abovementioned ratio for reducing the undesired currents.

In this respect, one advantage of the battery module lies in the fact that as a result of the proposed configuration of the contact plate the usable energy of the battery cells is increased and also the service life of the battery module is lengthened. As different voltage levels are reduced, and in particular, eliminated in the battery cells which are respectively connected together in the first group and in the second group to form parallel phases, the proposed battery module permits more reliable operation of a motor vehicle driven thereby and more precise calculations of the state-of-health and range.

The battery cell can basically be configured in any desired way, for example can have any desired longitudinal extent and/or transverse extent. The battery cell preferably has a cylindrical design, for example with a form factor of 18650 with a diameter of 18 mm as a transverse extent and a diameter of 65 mm as a longitudinal extent. Likewise, other battery cells with, for example, a form factor of 21700 can be used. The first pole is preferably configured or arranged as a positive pole and/or on a cover surface, and the second pole is configured or arranged as a negative pole and/or on another cover surface lying opposite. The contact plate can be formed in one piece from a conductive material such as metal or can comprise various metal layers.

The cutout preferably extends at an angle ≥0 degrees and ≤45 degrees and with respect to the transverse direction of the contact plate and can in this respect also run obliquely with respect to the transverse direction. The contact plate can have, between two adjacent first poles and second poles, a single cutout which extends between the first side and the second side or a multiplicity of individual cutouts. The cutout preferably reaches an edge of the contact plate on the first side and/or on the second side, but without segmenting the contact plate at the edge. In this way, a strip of contact plate remains at the edge between two adjacent first poles and/or second poles. In such a case, currents can flow in the longitudinal direction only at the strip. The cutout can extend continuously between these strips as a continuous cutout or be segmented into a plurality of parts. The longitudinal direction preferably extends parallel to the longitudinal axis of the contact plate and has a greater extent than the transverse direction running perpendicularly with respect to the longitudinal direction. The term adjacent to one another means, in particular, arranged one next to the other or directly one next the other. The width of the cutout is preferably ≥0.3 mm and ≤5 mm.

The contact plate preferably has a rectangular extent, and/or the resistance is measured in order to determine the ratio in the longitudinal direction and/or in the transverse direction along the entire extent in the longitudinal direction and/or in the transverse direction. The first group of battery cells and/or the second group of battery cells are/is preferably arranged one behind the other in series. The battery module can be used, in particular, for driving a motor vehicle which is embodied as an electric car, or for stationary accumulators. If a multiplicity of battery cells are provided in the battery module, they can be connected electrically in any desired fashion in order to correspondingly make available a voltage which is required to operate an electric vehicle and/or a required battery capacity.

In this context, according to one preferred development there is provision that the ratio of the resistance of the contact plate in the extent in the transverse direction, in particular, between two adjacent battery cells of the first group or of the second group with respect to the resistance of the contact plate between two adjacent battery cells of the first group and/or of the second group in the extent in the longitudinal direction is ≥2. Only the first group and the second group of the battery cells are preferably connected in series to the contact plate.

The ratio can basically have any desired value ≥2. According to one particularly preferred development, the ratio is ≥5, ≥10, ≥20 or ≥50, in order to reduce currents in the longitudinal direction of the contact plate completely or approximately completely.

According to yet another preferred development of the invention, the battery cells of the first group are arranged offset in the longitudinal direction with respect to the battery cells of the second group, and/or in each case three adjacent battery cells of the first group and of the second group are arranged offset with respect to one another in the manner of a triangle. For example, in each case two battery cells of the first group are arranged adjacent with a battery cell of the second group in the manner of a triangle. The offset arrangement or the arrangement in the manner of a triangle results in a space-saving configuration, in particular in the case of battery cells with a cylindrical shape.

In a further preferred embodiment, in each case three adjacent battery cells of the first group and of the second group are arranged offset with respect to one another in the manner of a triangle, and an, in particular, round first cutout is provided in the contact plate between the three adjacent battery cells. A cell holder can be attached to the first cutout. In addition, the contact plate can be fabricated with reduced weight by virtue of the first cutout, which is advantageous in particular in the case of a use in an electric car. The cutout preferably comprises the first cutout.

According to yet another further preferred embodiment, when there are two battery cells in the first group, in order to form the ratio a second, in particular, bar-like cutout extends away from the first cutout in the direction of the first side, between the two battery cells of the first part, and/or a third, in particular bar-like cutout extends away from the first cutout in the direction of the second side, between one of the two battery cells of the first part and the battery cell of the second part and/or between the battery cell of the second part and a further adjacent battery cell of the second part. The cutout preferably comprises the second cutout and/or the third cutout and/or a combination of a first cutout with a second cutout and/or a third cutout.

The second cutout and/or the third cutout extend, in particular, in the transverse direction and/or at an angle of ≥0 degrees and ≤45 degrees with respect to the transverse direction of the contact plate, in order to increase the resistance between the individual battery cells of the first group and of the second group, and in this way bring about channeling of the current flowing between the battery cells of the first group and of the second group, in the transverse direction of the contact plate. The second cutout and/or the third cutout can extend linearly, in a curved fashion and/or with a bend at an angle of ≥0 degrees and ≤45 degrees between two linear regions.

In the case of a triangle-like arrangement of the battery cells, the second cutout and/or the third cutout are preferably provided between three adjacent battery cells arranged in a triangle, in such a way that the resistance between one pair of battery cells whose electrical connection of the contact plate, in particular, is not segmented by the second cutout and/or the third cutout, is smaller than the resistance between at least one of the two other pairs between which the second cutout and/or the third cutout is provided. In other words, the formation of the second cutout and/or of the third cutout can reduce the cross-sectional area of the contact plate between the respective battery cells, as a result of which the resistance of the contact plate between these respective battery cells is increased. The current flowing between the battery cells of the first group and of the second group owing to the series connection of the battery cells is correspondingly channeled and flows, in particular, between battery cells of the first group and of the second group between which a second cutout and/or a third cutout is not formed in the contact plate.

In another preferred development, the second cutout and/or the third cutout divide/divides into two individual cutouts before the first side and/or the second side, which individual cutouts lie opposite one another and extend away in the direction of the two battery cells of the first group and/or the battery cell of the second group and the further adjacent battery cell of the second group. The individual cutouts can form, together with the second cutout and/or the third cutout, a T shape in a plan view and correspondingly extend away from the second cutout and/or the third cutout opposite one another as a lengthened portion with respect to one another. Likewise, the individual cutouts can extend away from the second cutout and/or the third cutout opposite one another in the form of a pitch circle. As a result of the individual cutouts, the strip of contact plate through which currents are channeled in the longitudinal direction can be formed at the edge of the contact plate. This strip extends in the transverse direction preferably ≥1 mm and ≤3 mm, and in the longitudinal direction ≥4 mm and ≤10 mm. Correspondingly, the two individual cutouts extend in the longitudinal direction preferably ≥4 mm and ≤10 mm. The second cutout and/or the third cutout preferably comprise/comprises the individual cutouts.

According to yet another preferred development, in order to form the ratio when there are three adjacent battery cells, forming three pairs, in the first group and in the second group, the contact plate has a second cutout and/or a third cutout in particular as described above between a pair of the adjacent battery cells of the first group and of the second group, in order to increase the resistance of the contact plate between the pair with respect to the resistance between the other pairs, in particular by the ratio.

The contact plate can basically be of any desired thickness. The contact plate particularly preferably has a thickness of ≤1 mm, ≤0.5 mm or ≤0.3 mm. The thickness of the contact plate preferably lies in the range ≥0.3 mm and ≤0.5 mm, and is particularly preferably 0.3 mm. The first side is preferably arranged opposite the second side, with the result that the battery cells of the first part and of the second part extend away from the contact plate in the same direction and/or parallel to one another. The battery cells of the first group and of the second group are preferably arranged at an edge of the contact plate.

According to a further preferred embodiment, the contact plate has, on the first side and/or on the second side, a material cutout which extend between two adjacent battery cells, from the first side and/or the second side and into the contact plate. The material cutout is preferably in the form of a pitch circle or has a pitch-circle-like shape. The contact plate is preferably manufactured by means of a punching method, stamping method, etching method and/or by laser. In an analogous fashion, the first cutout, the second cutout, the third cutout, the individual cutout and/or material cutout are advantageously formed in the contact plate and/or during the manufacture of the contact plate by a preceding punching method, stamping method, etching method or by laser, in order to meet the ratio ≥2.

According to another preferred development, 8, 15 or 22 battery cells are connected in parallel and/or a multiplicity of contact plates are provided by means of which 5, 8 or 13 battery cells are connected in series. In each case 8, 15 or 22 battery cells are preferably electrically connected in parallel, in series and/or in a straight line to the contact plate on each side of the contact plate, in particular by means of a resistance welding method.

The object of the invention is additionally achieved by a method for reducing currents in the longitudinal direction of a contact plate, extending in a transverse direction and in the longitudinal direction, of a battery module, with which method a multiplicity of battery cells, each having a first pole and a second pole, can be connected, having the step:

forming at least one cutout, extending in the transverse direction of the contact plate, between at least two designated connecting points at which the battery cells can be connected by their first poles and/or second poles to the contact plate, with a length, in that owing to the cutout the ratio of the resistance of the contact plate in the extent in the longitudinal direction with respect to the resistance of the contact plate in the extent in the transverse direction is ≥2.

Formation of the cutout is preferably carried out by means of a punching method, stamping method or by laser. The cutout preferably has a width of 0.5 mm, 1 mm or 2 mm in which material from the contact plate is removed. The contact plate is preferably constructed from a conductive material, in particular metal. The extent in the transverse direction or extent in the longitudinal direction means preferably the entire extent of the contact plate. A connecting point is preferably assigned to each pole. The cutout is preferably embodied as a previously described second cutout, third cutout and/or individual cutout. The cutout particularly preferably runs parallel to the transverse direction or up to 45 degrees with respect to the transverse direction of the contact plate. The length of the cutout is preferably ≥30% and ≤95%, ≥50% and ≤90% or ≥60% and ≤85% of the extent of the contact plate in the transverse direction.

According to one preferred development, the method comprises the step: connecting the respective first pole of a first group of the battery cells one next to the other to the designated connecting point of a first side, extending in the longitudinal direction, of the contact plate, and connecting the respective second pole of a remaining second group of the battery cells one next to the other to the desired connecting points of a second side, extending in the longitudinal direction, of the contact plate, with the result that, by means of the contact plate, the first group of the battery cells are connected in parallel via the first poles, the second group of the battery cells are connected in parallel via the second poles, and the first group of the battery cells and the second group of the battery cells are connected in series. The connection of the poles of the battery cells to the contact plate is preferably carried out by means of resistance welding. In another preferred development, the method comprises the step: forming the at least one cutout between the at least two designated connecting points, with the result that owing to the cutout the ratio of the resistance of the contact plate in the extent in the longitudinal direction between two adjacent battery cells of the first group and of the second group with respect to the resistance of the contact plate in the extent in the longitudinal direction between two adjacent battery cells of the first group or of the second group is ≥2.

Further embodiments and advantages of the invention are apparent to a person skilled in the art in a way analogous to the battery module described above.

BRIEF DESCRIPTION OF THE DRAWINGS

The invention will be explained in more detail below by means of preferred exemplary embodiments and with reference to the appended drawings, in which.

DETAILED DESCRIPTION OF THE EXEMPLARY EMBODIMENTS

Figure 1:
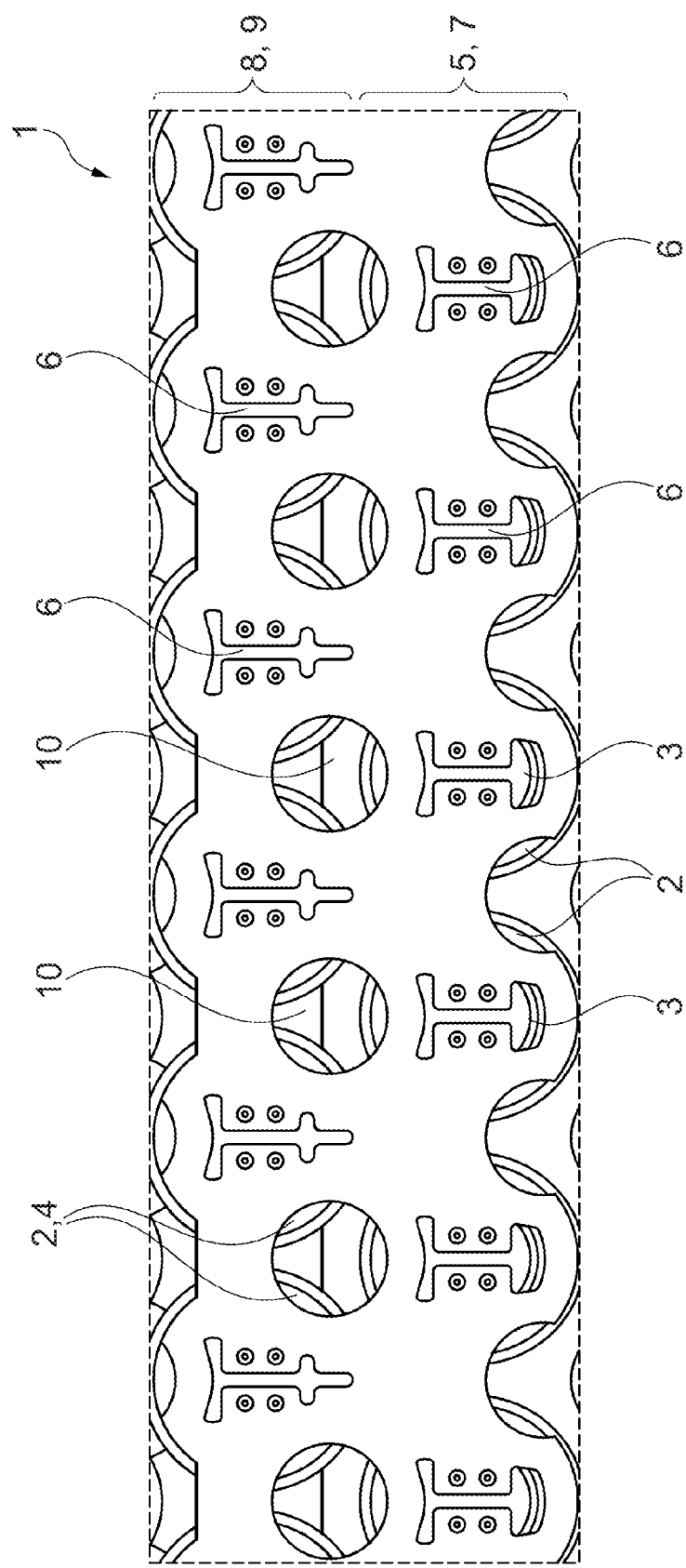
FIG. 1 shows a contact plate for a battery module for a motor vehicle having battery cells which are connected thereto according to the prior art in a schematic plan view.
Figure 2:
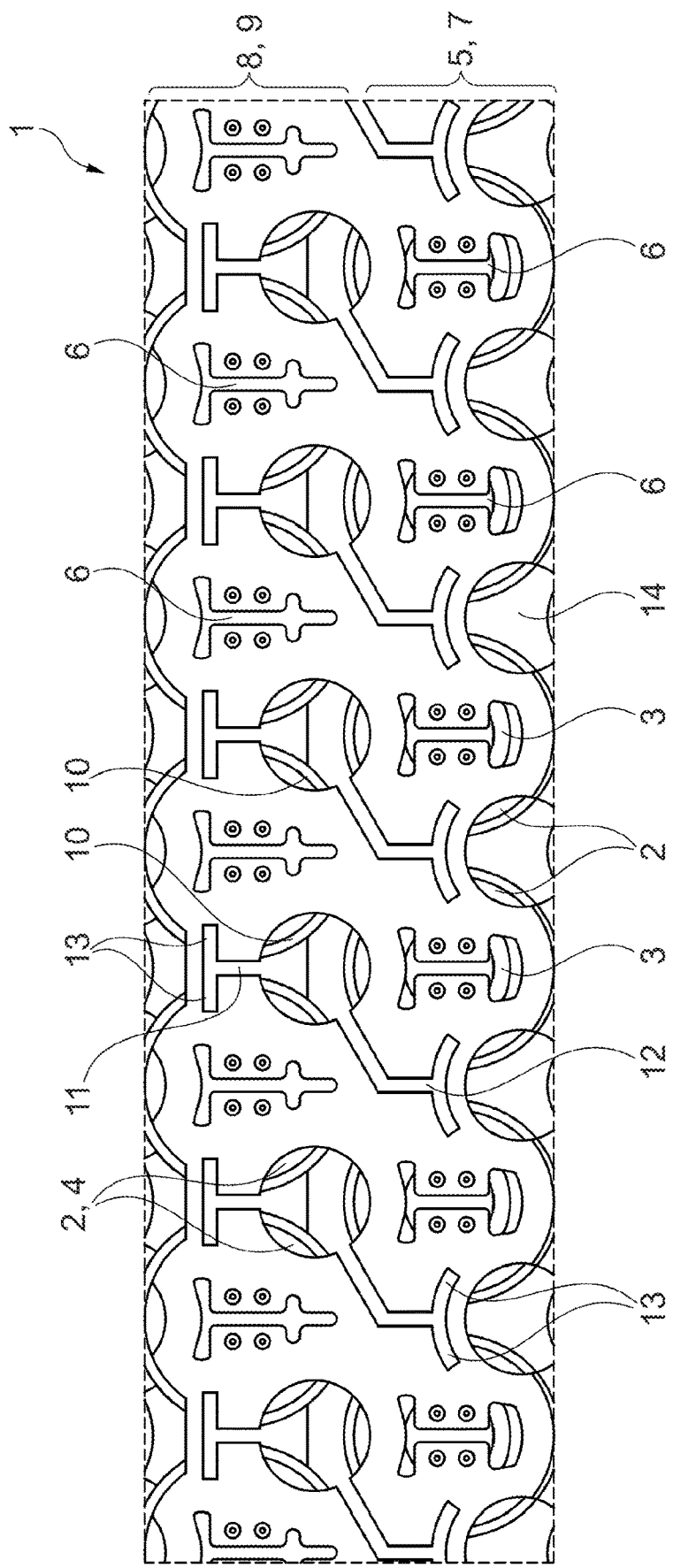
FIG. 2 shows a contact plate for a battery module for a motor vehicle having battery cells which are connected thereto, according to a preferred exemplary embodiment of the invention in a schematic plan view.
Figure 3:
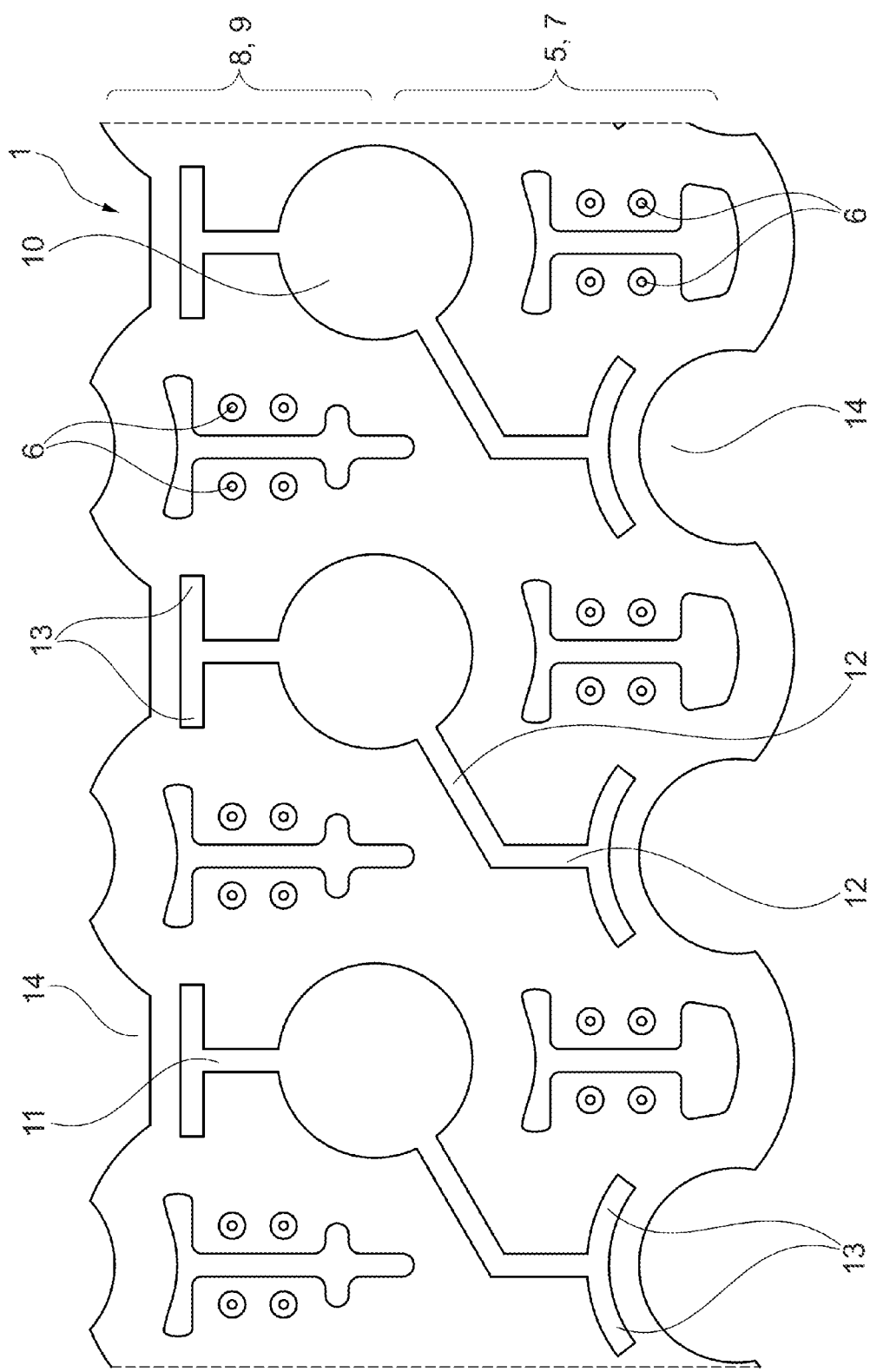
FIG. 3 shows a detail of the contact plate according to FIG. 2 without connected battery cells according to the preferred exemplary embodiment of the invention in a schematic plan view.

FIG. 1 shows a contact plate for a battery module for a motor vehicle having battery cells which are connected thereto, according to the prior art in a schematic plan view. FIG. 2 shows a contact plate 1 for a battery module for driving a motor vehicle which is embodied as an electric car and has battery cells 2 connected thereto, in a schematic plan view according to a preferred exemplary embodiment of the invention, while FIG. 3 shows a detail of the contact plate 1 according to FIG. 2 without connected battery cells 2 according to the preferred exemplary embodiment of the invention in a schematic plan view. The battery cells 2 are embodied according to the form factor 18650 and have in this way a cylindrical design with a diameter of 18 mm as a transverse extent and a longitudinal extent of 65 mm. The battery cells 2 have in each case a first pole 3, the positive pole, and a second pole 4, the negative pole, at their cover surfaces lying opposite one another.

The contact plate 1 extends in a transverse direction, vertically in the plane of the drawing, and in a longitudinal direction, horizontally in the plane of the drawing. A first group 5 of the battery cells 2 are electrically connected by their respective first pole 3 to respective connecting points 6 which are provided in the contact plate 1, and successively in a series to a first side 7, extending in the longitudinal direction, on an edge of the contact plate 1 by means of a resistance welding method. In an analogous fashion, a second group 8 of the battery cells 2 are electrically connected by their respective second pole 4 to respective connecting points 6 and subsequently in a row to a second side 9, extending in the longitudinal direction, on an opposite edge of the contact plate 1 by means of the resistance welding method.

In this way, by means of the contact plate 1, the first group 5 of the battery cells 2 are connected in parallel via the respective first poles 3, and the second pole 8 of the battery cells 2 are connected in parallel via the respective second poles 4, and the first group 5 of the battery cells 2 and the second group 8 of the battery cells 2 are connected in series. Adjacent battery cells 2 of the first group 5 and of the second group 8 are arranged offset with respect to one another in the manner of a triangle. Correspondingly, in each case a battery cell 2 of the first group 8 or of the second group 5 is arranged adjacent to, in each case, two adjacent battery cells 2 of the first group 5 or of the second group 8.

By means of this so-called delta connection of the battery cells 2, undesired currents come about in the longitudinal direction of the contact plate between the parallel phases of the battery cells 2 of the first group 5 and the battery cells 2 of the second group 8, which current give rise to less usable energy and reduce the service life of the battery cells 2 and therefore of the battery module. In addition, the currents give rise to undesired different voltage levels at the battery cells 2 of the respective parallel phases, as a result of which reliable operation of an electric vehicle which is driven with a battery module which is known from the prior art and shown in FIG. 1 cannot be ensured. In addition, the currents make it more difficult to carry out state-of-health, SOH, calculations and calculations relating to the range of the electric vehicle driven by the battery module.

The undesired currents in the longitudinal direction can be reduced or approximately completely reduced by channeling the current flowing in the contact plate 1. For this purpose, the contact plate 1 is, as described in more detail below, provided with a cutout 11, 12, 13. The cutout 11, 12, 13 which is described below and shown in FIG. 2 and FIG. 3 and is formed, in particular, by the second cutout 11, the third cutout 13 and/or the individual cutouts 12, ensures that the ratio of the resistance of the contact plate 1 in the extent in the longitudinal direction with respect to the resistance of the contact plate in the extent in the transverse direction is $\geq 2$ and, in particular, $\geq 5$ or $\geq 10$.

As is apparent in the figures, a circular first cutout 10 is provided in the contact plate 1 between, in each case, three battery cells 2 which are adjacent, that is to say arranged one next to the other, of the first group 5 and of the second group 8. In order to form the abovementioned ratio, in each case second bar-like cutouts 11 with a diameter of 1 to 2 mm extend from the respective circular first cutouts 10 as abovementioned cutouts, parallel to the transverse extent of the contact plate 1 in the direction of the second side 9 as far as the height of the connecting point 6, but without extending as far as the second side 9.

In the region of the connecting points 6, the second bar-like cutouts 11 each branch into two bar-like individual cutouts 12 which extend parallel to the longitudinal extent of the contact plate 1 in the direction of the connecting point 6 lying opposite, but without reaching as far as the connecting points 6. The two individual cutouts 12 extend as a lengthened portion with respect to one another and perpendicularly with respect to the second cutout 11, and form in this way in plan view a T shape by which the contact plate 1 is segmented.

In addition, in order to form the abovementioned ratio of the respective circular first cutouts 10 as cutouts, in each case third bar-like cutouts 12 with a diameter of 1 to 2 mm extend at an angle of 45° with respect to the transverse extent and/or with respect to the longitudinal extent of the contact plate 1 in the direction of the first side 9. The third cutouts 12 bend in the region before the connecting point 6 by 45° and run from the bend to the transverse extent of the contact plate 1 in the direction of the first side 7 as far as the height of the connecting point 6, but without reaching the first side 7.

In the region of the connecting point 6, the third cutouts 12 each branch into two bar-like individual cutouts 13 which extend in the longitudinal extent of the contact plate 1 with a curvature in the direction of the opposite connecting point 6 as far as the connecting point 6, but without reaching the connecting points 6. The two individual cutouts 13 each extend as a lengthened portion with respect to one another in a circular arc shape parallel to a respective material cutout 14 which is provided on the first side 7 between, in each case, two adjacent battery cells 2 and extends from the first side 7 into the contact plate 1.

The contact plate has a thickness of 0.3 mm, wherein the contact plate 1 is manufactured by means of a punching method, stamping method or by laser. Correspondingly, the first cutouts 10, the second cutouts 11, the third cutouts 12 and the individual cutouts 13 have been made in the contact plate 1 by the abovementioned punching method, stamping method or by laser, in order to form the cutout 11, 12 in order to implement the ratio $\geq 2$.

As a result, undesired currents in the longitudinal direction can be reduced or completely avoided by forming the cutout in the transverse direction of the contact plate 1. The resistance of the contact plate 1 in the longitudinal direction with respect to the transverse direction is increased by the ratio ≥2 by means of the second cutouts 11 and/or the third cutout 12, in particular in conjunction with the individual cutouts 13 and/or the first cutout 10.

The described exemplary embodiments are merely examples which can be modified and/or added to in a variety of ways within the scope of the claims. Each feature which has been described for a specific exemplary embodiment can be used independently or in combination with other features in any other desired exemplary embodiment. Any feature which has been described for an exemplary embodiment of a specific category can also be used in a corresponding way in an exemplary embodiment of another category.

LIST OF REFERENCE NUMBERS

Contact plate 1
Battery cell 2
First pole 3
Second pole 4
First group 5
Connecting points 6
First side 7
Second group 8
Second side 9
First cutout 10
Cutout, second cutout 11
Cutout, third cutout 12
Cutout, individual cutout 13
Material cutout 14

The invention claimed is:

1. Battery module having a multiplicity of battery cells, each having a first pole and a second pole and a contact plate which extends in a transverse direction and in a longitudinal direction, wherein
   a first group of the battery cells are connected by their respective first pole one next to the other to a first side, extending in the longitudinal direction, of the contact plate, and a remaining second group of the battery cells are connected by their respective second pole one next to the other to a second side, extending in the longitudinal direction, of the contact plate, with the result that, by means of the contact plate, the first group of the battery cells are connected in parallel via the first poles, and the second group of the battery cells are connected in parallel via the second poles, and the first group of the battery cells and the second group of the battery cells are connected in series,
   in each case three adjacent battery cells of the first group and of the second group are arranged offset with respect to one another in the manner of a triangle, and a first cutout in the contact plate is provided between the three adjacent battery cells, and
   when there are two battery cells in the first group a second cutout extends away from the first cutout between the two battery cells of the first group in the direction of the first side, and a third cutout extends away in the direction of the second side from the first cutout between one of the two battery cells of the first group and the battery cell of the second group and/or between the battery cell of the second group and a further adjacent battery cell of the second group, with the result that owing to the second and third cutouts the ratio of the resistance of the contact plate in the extent in the longitudinal direction with respect to the resistance of the contact plate in the extent in the transverse direction is ≥2.

2. Battery module according to the preceding claim 1, wherein the ratio of the resistance of the contact plate in the extent in the longitudinal direction between two adjacent battery cells of the first group or the second group with respect to the resistance of the contact plate in the extent in the transverse direction between two adjacent battery cells of the first group of the second group is greater ≥2.

3. Battery module according to the preceding claim 1, wherein the ratio is ≥5, ≥10, ≥20 or ≥50.

4. Battery module according to the preceding claim 1, wherein the battery cells of the first group are arranged offset in the longitudinal direction with respect to the battery cells of the second group, and/or in each case three adjacent battery cells of the first group and of the second group are arranged offset with respect to one another in the manner of a triangle.

5. Battery module according to the preceding claim 1, wherein the first cutout is embodied in a round fashion, and/or the second cutout and/or the third cutout are/is embodied in a bar-like fashion.

6. Battery module according to the preceding claim 1, wherein the second cutout and/or the third cutout divide/divides into two individual cutouts before the first side and/or the second side, which individual cutouts lie opposite one another and extend away in the direction of the two battery cells of the first group and/or the battery cell of the second group and the further adjacent battery cell of the second group.

7. Battery module according to the preceding claim 1, wherein the contact plate has a thickness of ≤1 mm, ≤0.5 mm or ≤0.3 mm, and/or the first side is arranged opposite the second side.

8. Battery module according to the preceding claim 1, wherein the contact plate has, on the first side and/or on the second side, material cutouts which extend between two adjacent battery cells, from the first side and/or the second side and into the contact plate.

9. Battery module according to the preceding claim 1, wherein 8, 15 or 22 battery cells are connected in parallel and/or a multiplicity of contact plates are provided, by means of which 5, 8 or 13 battery cells are connected in series.

10. Method for reducing currents in the longitudinal direction of a contact plate, extending in a transverse direction and in the longitudinal direction, of a battery module, with which a multiplicity of battery cells, each having a first pole and a second pole, can be connected, wherein
   a first group of the battery cells are connected by their respective first pole one next to the other to a first side, extending in the longitudinal direction, of the contact plate, and a remaining second group of the battery cells are connected by their respective second pole one next to the other to a second side, extending in the longitudinal direction, of the contact plate, with the result that, by means of the contact plate, the first group of the battery cells are connected in parallel via the first poles, and the second group of the battery cells are connected in parallel via the second poles, and the first group of the battery cells and the second group of the battery cells are connected in series, and in each case three adjacent battery cells of the first group and of the second group are arranged offset with respect to one another in the manner of a triangle, having the step:

forming a first cutout into the contact plate, between the three adjacent battery cells, forming, when there are two battery cells in the first group, a second cutout from the first cutout, between the two battery cells of the first group in the direction of the first side, and forming from the first cutout a third cutout between one of the two battery cells of the first group and the battery cell of the second group and/or between the battery cell of the second group and a further adjacent battery cell of the second group in the direction of the second side with a respective length in such a way that, owing to the second and third cutouts, the ratio of the resistance of the contact plate in the extent in the longitudinal direction with respect to the resistance of the contact plate in the extent in the transverse direction is ≥2.

11. Method according to the preceding method claim 10, having the step:

connecting the respective first pole of the first group of the battery cells one next to the other to the designated connecting point of the first side, extending in the longitudinal direction, of the contact plate, and connecting the respective second pole of the remaining second group of the battery cells one next to the other to the desired connecting points of the second side, extending in the longitudinal direction, of the contact plate.

\* \* \* \* \*